United States Patent [19]
Weber et al.

[11] Patent Number: 4,602,052

[45] Date of Patent: Jul. 22, 1986

[54] RUBBER COMPOSITION AND METHOD OF INCORPORATING CARBON BLACK AND A QUATERNARY AMMONIUM COUPLING AGENT SALT INTO NATURAL RUBBER CONTAINING COMPOSITIONS

[75] Inventors: Kenneth E. Weber, Pacific Palisades, Calif.; Dirk Oberlin, Aurora, Colo.

[73] Assignee: Amoco Corporation, Chicago, Ill.

[21] Appl. No.: 651,616

[22] Filed: Sep. 17, 1984

Related U.S. Application Data

[63] Continuation-in-part of Ser. No. 534,347, Sep. 21, 1983, abandoned, which is a continuation of Ser. No. 398,995, Jul. 16, 1982, abandoned.

[51] Int. Cl.$^4$ ............................ C08K 3/04; C08K 5/19; C08K 9/04; C08J 3/00

[52] U.S. Cl. ......................... 523/215; 523/216; 523/220; 523/333; 523/334; 523/200; 524/63; 524/65; 524/86; 524/87; 524/88; 524/89; 524/90; 524/93; 524/94; 524/95; 524/96; 524/97; 524/99; 524/100; 524/102; 524/104; 524/105; 524/106; 524/186; 524/236; 524/451; 524/496; 524/571; 524/575; 524/251; 524/252

[58] Field of Search ............... 524/496, 63, 65, 86–89, 524/90, 93, 94, 95, 96, 97, 99, 100, 102, 104, 105, 106, 186, 236, 451, 571, 575; 523/200, 215, 216, 220, 333, 334

[56] References Cited

U.S. PATENT DOCUMENTS

| | | | |
|---|---|---|---|
| 2,867,540 | 1/1959 | Harris | 523/215 |
| 3,627,723 | 12/1971 | Kealy | 524/111 |
| 3,840,382 | 10/1974 | Burke | 523/511 |
| 3,902,915 | 9/1975 | Crawford et al. | 106/308 N |
| 3,910,866 | 10/1975 | Morris | 525/370 |
| 3,922,240 | 11/1975 | Berg et al. | 524/236 |
| 3,998,778 | 12/1976 | Berg et al. | 524/571 |

*Primary Examiner*—Herbert J. Lilling
*Attorney, Agent, or Firm*—William H. Magidson; William T. McClain; Ralph C. Medhurst

[57] ABSTRACT

A rubber composition containing carbon black as a reinforcing filler and a quaternary ammonium salt as a coupling agent and a method of making it are disclosed.

26 Claims, 2 Drawing Figures

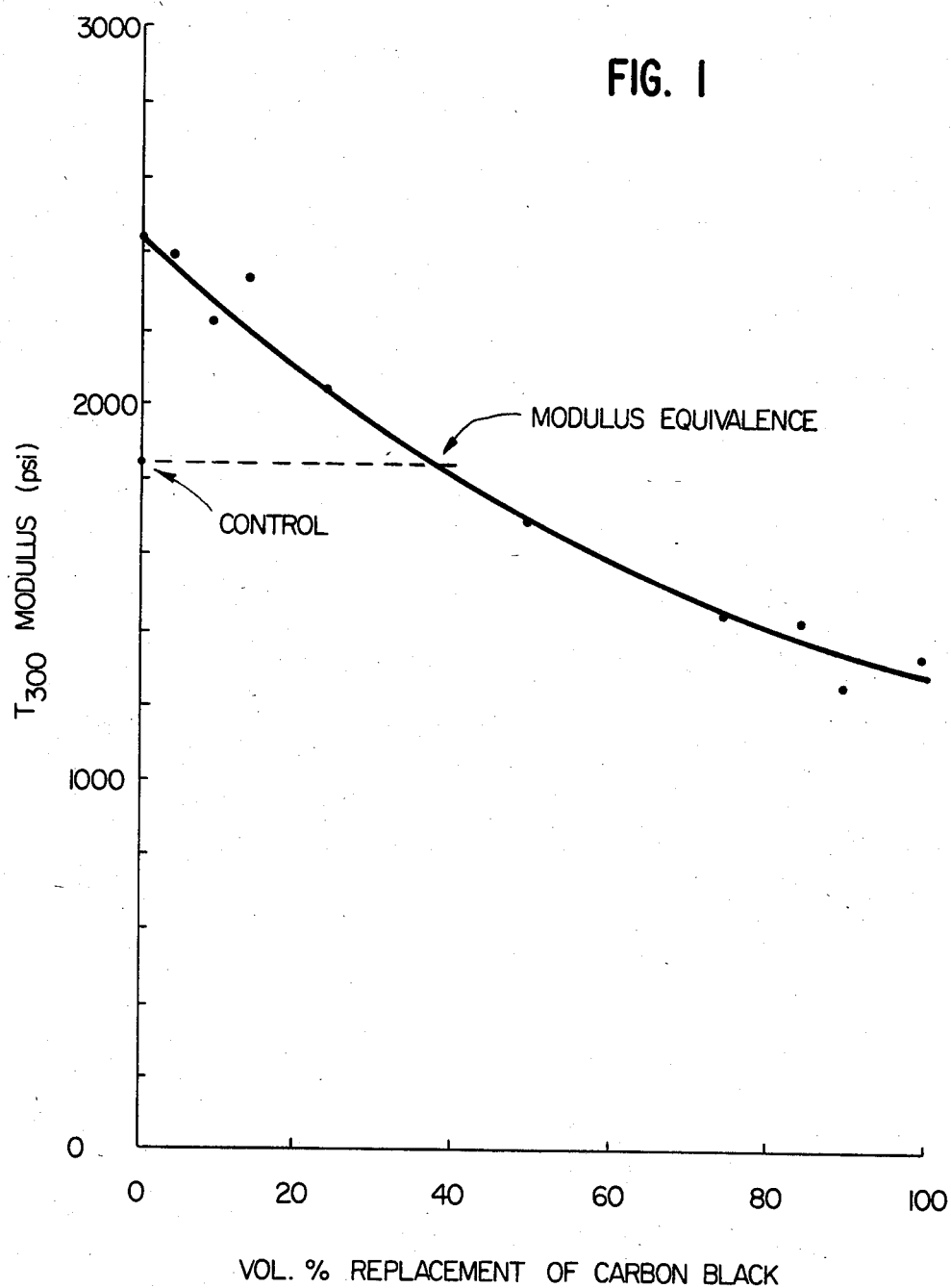

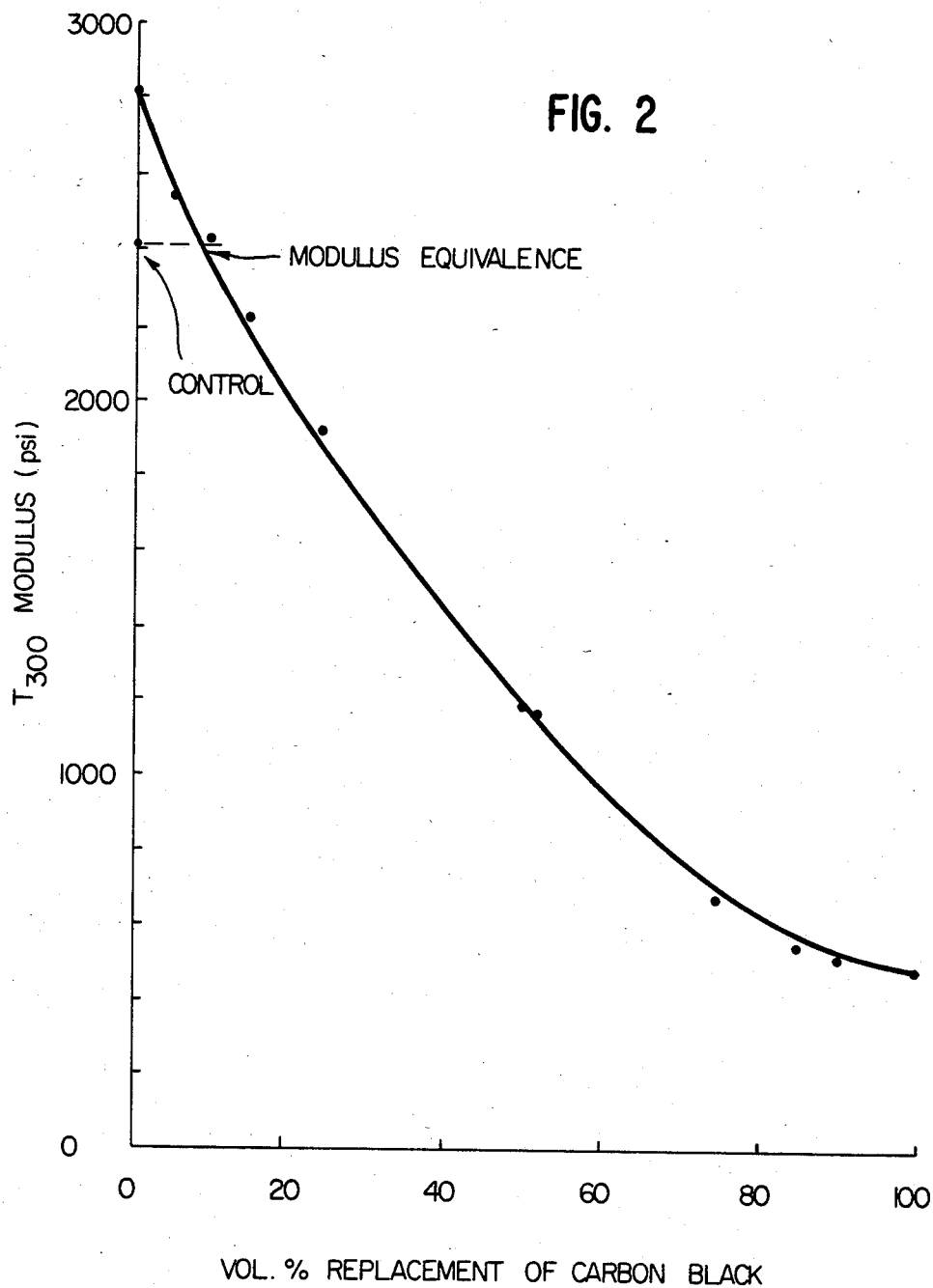

RUBBER COMPOSITION AND METHOD OF INCORPORATING CARBON BLACK AND A QUATERNARY AMMONIUM COUPLING AGENT SALT INTO NATURAL RUBBER CONTAINING COMPOSITIONS

REFERENCE TO RELATED APPLICATION

This is a continuation-in-part application of co-pending U.S. application Ser. No. 534,347, filed Sept. 21, 1983, now abandoned, which is a continuation of U.S. application Ser. No. 398,995, filed July 16, 1982, and now abandoned.

BACKGROUND OF THE INVENTION

This invention relates generally to a rubber composition and more particularly concerns a natural rubber composition comprising carbon black and a quaternary ammonium salt.

The precise formulation of any rubber compound depends on its intended end use. Different end uses require very specific mechanical properties. To a degree, the choice of filler and agent for coupling the rubber and filler determines the mechanical properties of the rubber compound. Because of the properties imparted to rubber compositions by carbon black, carbon black is the primary reinforcing filler almost universally used in certain types of rubber compositions, for example, those intended for use in tires for automobiles, trucks or other equipment. However, because of increases in the prices of petroleum products in general, and carbon black in particular, there has been great interest in replacing all or at least a significant part of the carbon black in rubber compositions with a less expensive material, in particular, one of the readily available non-carbon black fillers.

For example, Manual 3-S entitled "Sierra Mistron Vapor In Rubber Compounds," published in 1964 by Sierra Talc and Chemical Company (now Cyprus Mines Company), discloses that the replacement with talc of about 30 volume percent of the carbon black filler in a rubber composition affords a synergistic improvement in the tensile strength of the rubber composition.

Quaternary ammonium salts have also been disclosed for use with fillers or pigments. Technical Report 35-T entitled "Factors Affecting the Dispersion of Ultra-Fine Particle Size Mistron Talcs in Water and the Effects of Wetting and Dispersion Agents," published in 1956 by Sierra Talc & Clay Company (now Cyprus Mines Company) describes quaternary ammonium salts as effective dispersants for talc in water. Technical Report 45-T entitled "Mistrons in Hydrocarbon Solvents—Effects of Cationic Surfactants," published in 1958 by the former Sierra Talc & Clay Company described certain quaternary ammonium salts as dispersants of talc in plastics, rubber and other polymeric dispersions. German Offenlegungsschrift No. 2,224,003 which issued in 1972 contains a very similar disclosure. E. K. Lotakova, G. A. Blokh, E. V. Tsipenyuk, I. G. Lebed, T. G. Blokh, F. D. Ovcharenko, N. G. Vasileo, A. D. Chugai and V. A. Mashchenko, "Properties of Rubbers Filled with Modified Kaolins," Kozh.-Obuvn. Prom-st. Vol. 18(6), pp. 45–7 (1976) discloses the reinforcement of rubber with kaolin modified with benzyl-dimethylalkylammonium chloride. N. S. Gilinskaya, G. A. Sankina, M. S. Skorobogatova, "Effect of the Chemical Nature of Dihydric Phenols and Quaternary Ammonium Salts on the Properties of Vulcanized Rubbers Made from the Rubber SKR-26," Kauch. Rezina, Vol. 3, pp. 10–12 (1980) discloses the vulcanization of flouro rubber in the presence of quaternary ammonium salts.

Burke, U.S. Pat. Nos. 3,686,113; 3,689,452; and 3,840,382 disclose a rubber composition comprising a silica pigment, a quaternary ammonium salt and carbon black. Berg et al., U.S. Pat. Nos. 3,846,365; 3,922,240; and 3,998,778 disclose a method for making a powdered, flowable rubber composition comprising a solid filler wherein a quaternary ammonium salt is used as an emulsifier. Although Berg et al. disclose in each patent that the filler is preferably carbon black, they state in each case that in place of or "in addition thereto, light-colored fillers can also be used, e.g., highly active silicic acid, kaolin, ground slate, etc." and in U.S. Pat. No. 3,922,240 that "[c]ombinations of carbon black with light-colored fillers, preferably silicic acid, are also possible." In the Berg methods, the rubber and filler composition is formed by pouring an aqueous emulsion of the filler, rubber elastomer, and a quaternary salt emulsifier into a sodium silicate solution, from which the granular rubber precipitates. Although Berg does not disclose the composition of the rubber granules, analysis of a polybutadiene rubber produced by a duplication of Example 1 of the '778 patent showed the rubber contained about 53 weight % of the sodium silicate in the precipitating solution. Thus, all rubber compositions produced by the Berg methods contain silicate. Moreover, Berg does not disclose the beneficial effect on modulus properties of a quaternary ammonium salt when mechanically mixed with natural rubber before vulcanization, and thus shows no recognition of quaternary salts as a coupling agent.

U.S. Pat. 4,032,501, "Dry Blendable Solution Rubber Powders and Process," Schulz, issued June 28, 1977, like Berg, discloses a method of producing a rubber powder. As an emulsifier in an aqueous solution, Schulz employs a "foam inhibiting surfactant" which is disclosed as either a nonionic polyether alcohol or a tetraalkyl ammonium salt having more than 25 total carbon atoms. Schulz, however, does not disclose use of the quaternary salts as a coupling agent.

Kealy et al., U.S. Pat. No. 3,627,723, "Filler Loaded Elastomer Compositions Having Improved Extrudability and Physical Properties", issued Dec. 14, 1971, disclose rubber compositions of an α-olefin/non-conjugated diene copolymer, a filler of carbon black or mineral or mixtures thereof, and a surfactant. Named as possible mineral fillers are kaolin, calcined kaolin, magnesium silicate, blance fixe, whiting, silica and talc. The surfactant can be one of three broad classes, anionic, nonionic, and cationic, and named as a cationic are quaternary ammonium salts. However, the Kealy Examples show little difference in rubber properties due to a change in the surfactant. In contrast, only a quaternary ammonium salt exhibits improved rubber properties when used with a rubber such as natural rubber or styrene-butadiene rubber.

SUMMARY OF THE INVENTION

The present invention is a method of compounding rubber which comprises mechanically mixing and substantially uniformly dispersing A or B in natural rubber or polyisoprene rubber. A comprises (1) a reinforcing filler consisting essentially of particulate carbon black having a median particle size in the range of from about 0.001 to about 20 microns, and (2) a coupling agent consisting essentially of a quaternary ammonium salt at a level of from about 0.005 to about 15 phr. B comprises a particulate adduct consisting essentially of the carbon black and the quaternary ammonium salt, having a median particle size in the range of from about 0.01 to about 20 microns and present at a level such that the portion thereof contributed from the quaternary ammonium salt is at a level of from about 0.005 to about 15 phr.

In the resulting rubber composition, the amount of (1) the carbon black or the portion of the adduct contributed from the carbon black are in the range of from about 25 to about 400 phr and preferably from about 30 to about 120 phr, and (2) the quaternary ammonium salt is preferably from about 0.1 phr to about 1.5 phr.

The present invention is also a rubber composition formed by the aforesaid method. The present invention is further a natural rubber composition comprising a substantially uniform dispersion of A, B, or C, with the relative concentration of the carbon black as set forth above. C comprises the particulate adduct of B which is also an adduct with the rubber.

BRIEF DESCRIPTION OF THE DRAWINGS

FIG. 1 is a plot of $T_{300}$ modulus versus amount of clay in a natural rubber composition.

FIG. 2 is a plot of $T_{300}$ modulus versus amount of clay in a styrene-butadiene rubber composition.

DETAILED DESCRIPTION

According to the method of the present the aforesaid quaternary ammonium salt and carbon black can be mechanically mixed in any convenient, conventional rubber compounding process to form the resulting rubber composition of this invention. The rubber suitably substantially comprises natural rubber because of the unexpectedly higher increase in modulus property, when compared to other tire rubbers, seen in natural rubber when formulated according to the invention. However, it is intended that the scope of the claims includes mixtures of natural rubber with other rubbers such as polybutadiene or synthetic polyisoprene rubber wherein the natural rubber comprises at least about 5%, and preferably about 30% of the elastomer total. At least 5% natural rubber is needed in a rubber mixture to achieve a beneficial effect on the vulcanizate rubber modulus. Thirty % natural rubber is preferred because vulcanizates with this amount exhibit significantly improved properties.

While any of the conventional curing agents known to the art can be employed in the method of compounding the rubber composition of this invention, typical curing agents include sulfur or sulfur-donating materials (in combination with suitable accelerators) and peroxide and other free radical producing agents. Preferably, sulfur or a sulfur-donating material is employed.

By the term "carbon black" as used herein is meant any carbon black suitable for use by the rubber industry and set forth under the title "carbon blacks" at pages 186–192 of the publication entitled "Rubber World Blue Book" published by B. C. Kovach for Rubber World in 1981 and incorporated herein by reference. Typical suitable carbon blacks include carbon blacks having the ASTM designations N220, N330, N550 and N660.

The median particle size of the carbon black particles in the method and rubber composition of this invention preferably is in the range of from about 0.001 micron to about 1 micron. In the present context, the median particle size is determined from a plot of the weight percent of particles having equivalent spherical diameters smaller than a particular equivalent spherical diameter. The carbon black or the portion of the adduct contributed from carbon black is preferably in the range of from about 30 to about 200 phr, more preferably to about 120 phr.

Without wishing to be bound by theory, Applicants believe the quaternary ammonium salt of the invention functions as the coupling agent for the filler to the rubber. It is believed to do this by (1) increasing the amount of cross linking between all essential components in the rubber and (2) by wetting of the filler surface. That the quaternary is functioning as a coupling agent is seen in the increase in $T_{300}$ modulus seen when the quaternary is added. The modulus data is discussed below.

Any quaternary ammonium salt can be used in the rubber composition of this invention. Suitable quaternary ammonium salts for use in the rubber composition of this invention are disclosed in Burke, U.S. Pat. No. 3,686,113, column 5, line 11 to column 7, line 75, which is incorporated by reference herein. In addition, for the present purposes, "quaternary ammonium salts" include any cyclic salt which contains either within its ring structure or as a substituent on its ring structure at least one nitrogen atom covalently bonded to three moieties and which salt has a highly conjugated, resonance stabilized, substantially planar structure which can be depicted such that the aforesaid nitrogen atom is attached to one of the aforesaid moieties through a double bond and carries a positive charge. Readily available examples of such compounds include the following: acid fuchsin, acridine red, acridine orange, aniline blue, azure A, azure B, azure C, basic fuchsin, blue tetrazolium, brilliant green, 2-tertiary butyl-5-methylisoxazolium tetrafluoroborate, coomassie brilliant blue R, crystal violet, 3,3'-(3,3'-dimethoxy-4,4'-biphenylene) bis[2-(p-nitrophenyl)-5-phenyltetrazolium chloride], 3-(4,5-dimethyl-2-thiazolyl)-2,5-diphenyl-2H-tetrazolium bromide, ethyl violet, fast green FCF, 1-(p-hydroxyphenyl)-2,4,6-triphenylpyridinium betaine, 2-(p-iodophenyl)-3-(p-nitrophenyl)-5-phenyl-2H-tetrazolium chloride, janus green B, light green SF yellowish, lissamine rhodamine B sulfonyl chloride, methylene blue, methyl green, methyl violet, nile blue A perchlorate, nitron, oxazine 1 perchlorate, pararosaniline acetate, pyronin B, pyronin Y, rhodamine B, rhodamine 6G, rhodamine 110, rhodamine 6G perchlorate, safranin 0, thiamine hydrochloride, toluidine blue 0, 2,3,5-triphenyl-2H-tetrazolium chloride, xylene cyanole FF, oxacarbocyanine, methylene green, cyanine, carbocyanine, styryl thiacarbocyanine, and 1,1-diethyl-2,2-quinocyanine chloride. In general, many sensitizing dyes are positively charged cyclic compounds with structures that meet the aforesaid requirements. Representative classes of such dyes which are suitable as quaternary ammonium salts include the following: cyanines, merocyanines, carbocyanines, thiacyanines and benzothiazolylrhodanines.

Preferably, the quaternary ammonium salt has a structure of formula I, II, III, IV or V.

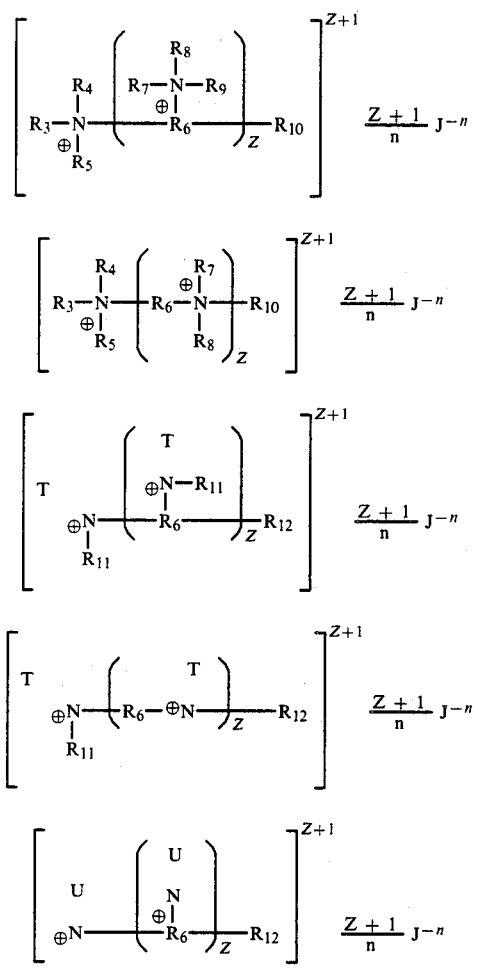

In formulas I, II, III, IV and V, Z is zero or a positive integer from 1 to 100, J is an anionic radical, n is the absolute value of the oxidation state of J and $R_6$ is an alkylenyl radical containing from 2 to 20 carbon atoms or an aryl radical containing from 6 to 14 carbon atoms.

In formulas I and II, $R_3$, $R_4$, $R_5$, $R_7$, $R_8$ and $R_9$ are the same or different and are each selected from the group consisting of: aliphatic radicals containing a total of from 1 to 3 carbon atoms which are saturated or unsaturated and unsubstituted or substituted with at least one hydroxy or alkoxy group; straight- or branched-chain aliphatic radicals containing a total of from 8 to 40 carbon atoms which are saturated or unsaturated and unsubstituted or substituted with at least one hydroxy, alkoxy or polyalkoxy group; and aryl radicals containing from 6 to 18 carbon atoms; and saturated or unsaturated araliphatic radicals containing a total of from 7 to 48 carbon atoms.

In formulas I and II, when Z is zero, $R_{10}$ is selected from the group consisting of the groups described by $R_3$, $R_4$, $R_5$, $R_7$, $R_8$ and $R_9$, and when Z is a positive integer, $R_{10}$ is selected from the group consisting of the groups described by $R_3$, $R_4$, $R_5$, $R_7$, $R_8$ and $R_9$ and a hydrogen atom.

In formulas I and II, (1) at least one of $R_3$, $R_4$, $R_5$, $R_7$, $R_8$, $R_9$, and $R_{10}$ is an aliphatic radical containing a total of from 1 to 3 carbon atoms and (2) either (a) at least one of $R_3$, $R_4$, $R_5$, $R_7$, $R_8$, $R_9$ and $R_{10}$ is an aliphatic radical containing at least 12 carbon atoms, or (b) at least two of $R_3$, $R_4$, $R_5$, $R_7$, $R_8$, $R_9$ and $R_{10}$ are aliphatic radicals containing at least 8 carbon atoms.

In formulas III and IV, $R_{11}$ is selected from the group consisting of the groups described by $R_3$, $R_4$, $R_5$, $R_7$, $R_8$ and $R_9$ and alkylamidoalkyl or alkylesteralkyl groups containing a total of at least 14 carbon atoms. In formulas III, IV and V, when Z is zero, $R_{12}$ is selected from the group consisting of the groups described by $R_{11}$, and when Z is a positive integer, $R_{12}$ is selected from the group consisting of the groups described by $R_{11}$ and a hydrogen atom.

In formulas III, IV and V, each of T and U is a radical which, in conjunction with each nitrogen atom to which it is shown attached in formula III, IV or V, forms a heterocyclic radical containing at least one nitrogen atom in the ring system and containing only nitrogen and carbon atoms in the ring system, and the T and U portions of the ring system are unsubstituted, or substituted by at least one alkyl group with the total number of ring substituents on each of T and U being from 1 to 32 carbon atoms.

In formulas I, II, III, IV and V, Z preferably is zero or a positive integer from 1 to 5 and more preferably is zero or 1. J is suitably an organic radical such as methyl sulfate or acetate or an inorganic radical such as halide, nitrite, nitrate, sulfate or phosphate.

If $R_3$, $R_4$, $R_5$, $R_7$, $R_8$, $R_9$, $R_{10}$, $R_{11}$, or $R_{12}$ is an aliphatic radical containing from 1 to 3 carbon atoms, preferably the radical is a methyl radical. If $R_3$, $R_4$, $R_5$, $R_7$, $R_8$, $R_9$, $R_{10}$, $R_{11}$, or $R_{12}$ is an aliphatic radical containing at least 8 carbon atoms, such radical preferably contains from 12 to 22 carbon atoms. Furthermore, if $R_3$, $R_4$, $R_5$, $R_7$, $R_8$, $R_9$, $R_{10}$, $R_{11}$ or $R_{12}$ is an aliphatic radical containing at least 8 carbon atoms and a polyalkoxy radical, preferably the polyalkoxy radical contains from 2 to 15 repeating ethoxy radical units.

If $R_3$, $R_4$, $R_5$, $R_7$, $R_8$, $R_9$, $R_{10}$, $R_{11}$, or $R_{12}$ is an araliphatic radical, such radical preferably contains from 7 to 22 carbon atoms.

Preferably, at least one of $R_3$, $R_4$, $R_5$, $R_7$, $R_8$, $R_9$, $R_{10}$, $R_{11}$ and $R_{12}$ is a methyl radical. At least one of $R_3$, $R_4$, $R_5$, $R_7$, $R_8$, $R_9$, $R_{10}$, $R_{11}$ and $R_{12}$ is preferably an aliphatic radical containing at least 12 carbon atoms, more preferably an aliphatic radical containing from 12 to 22 carbon atoms and most preferably a straight-chain aliphatic radical containing from 12 to 22 carbon atoms.

$R_6$ is preferably an alkylenyl radical containing from 2 to 6 carbon atoms and more preferably an alkylenyl radical containing 2 or 3 carbon atoms.

The sole difference between T in formulas III and IV and U in formula V is that T is attached through two single bonds to the nitrogen atom shown in formulas III and IV, and U is attached through one single and one double bond to the nitrogen atom shown in formula V.

Typical quaternary ammonium radicals formed by T or U in conjunction with the nitrogen atom to which it is shown attached in formula III, IV or V include the following: pyrrolidinium, pyrrolium, pyrrolinium, imidazolium, pyrazolium, triazolium, pyridinium, pyrimidinium, pyridazinium, pyrazinium, triazinium, indolium, indazolium, benzimidazolium, quinolinium, isoquinolinium, cinnolinium, phthalazinium, quinazolinium, quinoxalinium, naphthyridinium, quinolizinium, carbazolium, acridinium, phenazinium, phenanthridinium, phenanthrolinium, benzo[H-]isoquinolinium, purinium, porphinium, and pteridinium and the quaternary ammonium salts formed by partial or complete hydrogenation of the heterocyclic rings of any of the aforesaid quaternary ammonium salts.

Preferably the quaternary ammonium salt radical formed by T or U in conjunction with the nitrogen atom to which it is shown attached in formula III, IV or V is an imidazolinium salt or a pyridinium salt.

Most preferably, the quaternary salt is of Formula I, wherein Z is zero, $R_3$ and $R_4$ are methyl radicals, $R_5$ and $R_{10}$ are tallow radicals.

In the rubber composition of this invention formed according to the method of this invention, the quaternary ammonium salt is at a level of from about 0.005 phr, preferably from about 0.10 phr, to about 15 phr, preferably to about 1.5 phr. If introduced directly in the method of this invention, the quaternary ammonium salt is introduced at a level in the range of from about 0.005 phr, preferably from about 0.10 phr, to about 15 phr, preferably to about 1.5 phr. If the quaternary ammonium salt is introduced in the method of this invention in the form of an adduct with the carbon black, such adduct is introduced at a level such that the portion of the adduct contributed from the quaternary ammonium salt is introduced at a level of from about 0.005 phr, preferably from about 0.10 phr, to about 15 phr, preferably to about 1.5 phr.

Applicants prefer to use quaternary in an amount less than about 1.5 phr because amounts above this can result in "bleed-out." This refers to the appearance of a waxy film on the vulcanizate surface when greater than 1.5 phr quaternary is used. Vulcanizates exhibiting the waxy film demonstrate inconsistent properties in that some can be more difficult to process and can have lower tensile properties than those with less than 1.5 phr quaternary.

Preparation of the rubber composition of this invention by the method of this invention can be effected by any mechanical mixing method which can accommodate the introduction of the quaternary ammonium salt and the particulate filler. Whether the carbon black filler and quaternary ammonium salt are introduced in the compounding process simultaneously or at different stages or whether as separate components or in the form of their adducts as described hereinabove is generally a matter of convenience. In certain instances, for example, when the quaternary ammonium salt is difficult to disperse uniformly in the rubber, it is preferred to first form an adduct of it with the carbon black filler and then to disperse the adduct in the rubber.

In one suitable method of preparation, a batch of natural rubber is initially mixed in a conventional internal mixer such as a Banbury mixer. As mixing proceeds, the temperature of the rubber increases. When the temperature reaches a temperature in the range of from about 40° C. to about 60° C., a metallic oxide, typically zinc oxide, at a level of from about 1 to about 10 phr, a fatty acid, typically stearic acid, at a level of from about 0.5 to about 5 phr, and an antiozonant, typically N-(1,3-dimethylbutyl)-N-phenyl-p-phenylenediamine, at a level of from about 0.5 to about 7 phr, an antioxidant, typically polymerized 1,2-dihydro-2,2,4-trimethylquinoline, at a level of from about 0.5 to 5 phr and a petroleum wax at a level of from about 0.5 to 5 phr are introduced into the rubber during mixing. In the alternative, the oxide, fatty acid, antiozonant, antioxidant and wax can be introduced initially with the rubber.

Mixing is then continued until the temperature of the mixing increases to a temperature in the range of from about 70° C. to about 80° C., at which point a softening agent, such as process oil, and the carbon black and quaternary ammonium salt are added.

Mixing is continued until the temperature of the mixture reaches about 80° C. to about 90° C. At this point the curing agent(s) is (are) added at a level of from about 1 to about 10 phr, and mixing is continued until the temperature reaches about 110° C. or for about a minute, whichever is shorter. Typical curing agents include sulfur and sulfur-donating materials (in combination with suitable accelerators commonly known in the art) and peroxides and other free radical producing systems.

The resulting mixture is then removed from the mixer and formed into a predetermined shape, for example, sheets. After storing overnight, the shaped mixture is cured by pressure molding at 160° C. for about a period of time corresponding to $T_c(90)$, as defined hereinafter.

In the alternative, the particulate adduct of the carbon black and the quaternary ammonium salt may be formed in any suitable separate pretreatment step, and the resulting adduct, instead of the separate components from which the adduct is made, is introduced into the rubber in the above procedure. For example, a particulate adduct of the carbon black filler particles and quaternary ammonium salt is prepared by agitating the mineral particles in a Littleford Brothers Model KM 130 Mixer. Then the quaternary salt component of the adduct to be made, diluted in a solvent such as process oil or isopropyl alcohol if desired, is sprayed through a nozzle into the agitated mineral particles, and the resulting mixture is stirred for about 15 minutes and is thereafter removed from the mixer. Drying, if needed to remove solvent, is performed at a temperature below the decomposition temperature of the quaternary salt when in the adduct. For example, the Adogen 470 used in the Examples should be dried at leass than about 80° C.

More simply, the quaternary ammonium salt is introduced into either the carbon black and the mixture is blended in a dry blend mixer to a uniform consistency. The resulting adduct is then dried overnight.

The following examples describe in detail compositions and methods illustrative of the present invention. It will be apparent to those skilled in the art that many modifications, both of materials and methods, may be practiced without departing from the purpose and intent of this disclosure.

EXAMPLES 1–43

To illustrate the method and natural rubber compositions of the invention, rubber formulations according to the ASTM-NR formulation but containing varying amounts of clay and a quaternary salt were made and vulcanized. The compositions also varied from the ASTM-NR by the addition of 1 phr plasticizer to aid processing in laboratory equipment. The starting material in each of Examples 1–43 contained 100 parts natural rubber, 50 parts ASTM N330 carbon black, and 1 part of the plasticizer Reogen TM (manufactured by R. T. Vanderbilt). The starting material was introduced into a Banbury mixer with 3 parts of stearic acid, 5 parts of zinc oxide and varying amounts of clay mixed with varying amounts of dimethyl ditallow ammonium chloride (Adogen 470, from Sherex), and mixing was continued for 5 minutes at a temperature below 300° F. until the clay, salt, zinc oxide and stearic acid were fully incorporated into the rubber and the mixture appeared homogeneous. The control Examples without mineral and quaternary salt were mixed similarly. The amounts of clay added were on a volume % replacement of the carbon black basis. In the Examples with clay, it was necessary to add additional natural rubber and Reogen to the particular Example's starting material, from which the desired volume of carbon black had been removed, before addition of the clay to maintain 1 phr Reogen and the ASTM-NR formulation of 100 parts natural rubber. This was done by mixing the additional materials with the starting material before addition to the Banbury.

The master batch produced in the Banbury was removed, cooled, sheeted, cut into small pieces, and returned to the Banbury. Two and one-half parts sulfur and 0.6 parts Altax, an accelerator, were added and mixed for two minutes at 200° F. The final mix was transferred to a curing mold and cured at 160° C.

The clay and Adogen 470 were premixed before addition to the Banbury by spraying a 40 weight % Adogen 470 in isopropyl alcohol solution containing the desired weight of Adogen onto the desired amount of clay, and drying overnight at 80°–90° C. The clay used was Windsor Clay from Aiken, South Carolina (available from Cyprus Industrial Minerals) with a median particle size of 0.5 microns and had been degritted to $<\frac{1}{2}\%$ on a 325 mesh screen. The amounts of quaternary ammonium salt and clay employed in each Example are shown in Table I.

The vulcanized products were tested by standard methods to determine their rheometric, static, dynamic, tear, hardness, rebound and flex fatigue properties, as described hereinbelow.

The rheometric data were obtained using ASTM test D-2084-75 with a 1° amplitude of oscillation of the test disk about its center position and at 320° F. and are presented in Table I. $M_L$ and $M_H$ represent the minimum torque and maximum torque, respectively. $T_{S2}$ represents the time to 2 units of torque increase above the minimum and is accepted as the scorch time. $T_c(10)$ and $T_c(90)$ represent the times to 10 and 90 percent, respectively, of full torque development, and $T_c(90)$ is accepted as the cure time.

The static properties were measured in accordance with ASTM test D-412-75 Method A, and the test results are presented in Table II. $E_u$ and $T_u$ represent the ultimate elongation and ultimate tensile strength, respectively. $T_{100}$, $T_{200}$, $T_{300}$ and $T_{400}$ represent the pounds per square inch developed at 100, 200, 300 and 400 percent elongation, respectively.

The dynamic properties were measured using a Dynastat Viscoelastic Analyzer marketed by Imass, Inc. of Accord, Mass. The test samples were each in the shape of a cylindrical button of 0.5-inch diameter and 0.375-inch height. The results are presented in Table III. The reported results were obtained at a frequency of 10 Hertz and at room temperature. M' represents the storage or elastic modulus, and M" represents the viscous or loss modulus. M' and M" are denoted and measured as E' and E" on the Dynastat Analyzer. Tan Delta is the quotient obtained by dividing M" by M'. Tan Delta is a property which is indicative of heat buildup with cyclical flexing and is an important characteristic in compositions for use as tire sidewall and tread stock. These dynamic properties can also be measured by other techniques known in the art.

The tear resistance properties were measured by trouser tear testing and are reported in Table I. Shore A Hardness was measured using ASTM test D-2240-75 and is in Table II. Rebound D when measured was made using ASTM test D-2632. Fatigue when measured was made using the Monsanto Fatigue To Failure Tester and method.

TABLE I

| Example No. | 4° Salt (phr) | % CB Repl. | Tear-Rating | $T_{S2}$ (min.) | $T_c(10)$ (min.) | $T_c(90)$ (min.) |
|---|---|---|---|---|---|---|
| 1[a] | 0.0 | 0 | E | 2.5 | 2.65 | 10.8 |
| 2 | " | 5 | GE | 2.6 | 2.7 | 11.0 |
| 3 | " | 10 | G | 3.0 | 3.1 | 11.8 |
| 4 | " | 15 | G | 3.0 | 3.1 | 12.2 |
| 5 | " | 25 | FG | 2.7 | 2.8 | 12.2 |
| 6 | " | 50 | PF | 2.7 | 2.7 | 12.2 |
| 7 | " | 75 | P | 2.7 | 2.6 | 11.2 |
| 8 | " | 85 | P | 3.3 | 3.3 | 11.9 |
| 9 | " | 90 | P | 3.1 | 3.0 | 11.8 |
| 10 | " | 100 | P | 3.7 | 3.7 | 11.8 |
| 11 | 0 | 0 | G | 2.65 | 2.75 | 11.8 |
| 12 | 0.2 | 0 | GE | 1.6 | 2.0 | 7.5 |
| 13 | " | 5 | G | 2.0 | 2.1 | 7.6 |
| 14 | " | 10 | G | 2.0 | 2.1 | 7.9 |
| 15 | " | 15 | G | 1.9 | 2.0 | 7.6 |
| 16 | " | 25 | GE | 2.1 | 2.2 | 8.0 |
| 17 | " | 50 | F | 2.3 | 2.4 | 9.5 |
| 18 | " | 75 | P | 2.8 | 2.8 | 9.6 |
| 19 | " | 85 | P | 3.4 | 3.4 | 11.9 |
| 20 | " | 90 | P | 3.7 | 3.6 | 12.1 |
| 21 | " | 100 | P | 4.8 | 4.3 | 17.1 |
| 22[a] | 0 | 0 | GE | 2.7 | 2.8 | 11.5 |
| 23 | 0.4 | 0 | GE | 1.7 | 1.8 | 6.3 |
| 24 | " | 5. | G | 1.6 | 1.8 | 6.2 |
| 25 | " | 10 | G | 1.8 | 1.9 | 6.2 |
| 26 | " | 15 | G | 1.8 | 1.9 | 6.4 |
| 27 | " | 25 | G | 1.8 | 1.9 | 6.3 |
| 28 | " | 50 | FG | 2.0 | 2.1 | 6.9 |
| 29 | " | 75 | P | 2.3 | 2.3 | 7.4 |
| 30 | " | 85 | P | 2.5 | 2.5 | 8.0 |
| 31 | " | 90 | P | 2.6 | 2.5 | 7.9 |
| 32 | " | 100 | P | 2.9 | 2.8 | 8.7 |
| 33[a] | 0 | 0 | G | 2.6 | 2.7 | 11.6 |
| 34 | 0.6 | 0 | GE | 1.5 | 1.6 | 5.9 |
| 35 | " | 5 | E | 1.5 | 1.6 | 6.0 |
| 36 | " | 10 | G | 1.5 | 1.6 | 5.8 |
| 37 | " | 15 | G | 1.6 | 1.7 | 5.8 |
| 38 | " | 25 | G | 1.6 | 1.7 | 5.9 |
| 39 | " | 50 | G | 1.7 | 1.8 | 5.9 |
| 40 | " | 75 | F | 1.9 | 2.0 | 6.3 |
| 41 | " | 85 | P | 2.0 | 2.2 | 6.4 |
| 42 | " | 90 | P | 2.0 | 2.2 | 6.4 |
| 43 | " | 100 | P | 2.5 | 2.5 | 6.9 |

[a]Average of two samples.
E = Excellent
GE = Good to Excellent
G = Good
FG = Fair to Good
F = Fair
FP = Fair to Poor
P = Poor

TABLE II

| Example No. | % CB Repl. | $E_u$ (%) | $T_u$ (psi) | $T_{300}$ (psi) | Shore A Hardness |
|---|---|---|---|---|---|
| 1[a] | 0 | 460 | 2952 | 1662 | 65 |
| 2 | 5 | 469 | 2934 | 1551 | 63 |
| 3 | 10 | 466 | 2842 | 1492 | 62 |
| 4 | 15 | 490 | 2905 | 1426 | 60 |
| 5 | 25 | 506 | 3009 | 1355 | 59 |
| 6 | 50 | 526 | 3304 | 1336 | 56 |
| 7 | 75 | 551 | 3570 | 1290 | 55 |
| 8 | 85 | 534 | 3551 | 1271 | 54 |
| 9 | 90 | 513 | 3212 | 1268 | 54 |
| 10 | 100 | 513 | 3172 | 1161 | 53 |
| 11[a] | 0 | 438 | 2908 | 1803 | 65 |
| 12 | 0 | 439 | 3185 | 2001 | 66 |
| 13 | 5 | 462 | 3187 | 1839 | 65 |
| 14 | 10 | 453 | 3139 | 1820 | 65 |
| 15 | 15 | 476 | 3180 | 1684 | 64 |
| 16 | 25 | 487 | 3237 | 1618 | 62 |

TABLE II-continued

| Example No. | % CB Repl. | $E_u$ (%) | $T_u$ (psi) | $T_{300}$ (psi) | Shore A Hardness |
|---|---|---|---|---|---|
| 17 | 50 | 524 | 3556 | 1520 | 56 |
| 18 | 75 | 544 | 3560 | 1310 | 55 |
| 19 | 85 | 527 | 3090 | 1161 | 53 |
| 20 | 90 | 512 | 2964 | 1149 | 52 |
| 21 | 100 | 507 | 2574 | 1028 | 50 |
| 22[a] | 0 | 472 | 3313 | 1892 | 67 |
| 23 | 0 | 448 | 3696 | 2308 | 70 |
| 24 | 5 | 429 | 3328 | 2173 | 68 |
| 25 | 10 | 462 | 3709 | 2144 | 67 |
| 26 | 15 | 472 | 3680 | 2050 | 67 |
| 27 | 25 | 496 | 3713 | 1836 | 65 |
| 28 | 50 | 546 | 3703 | 1481 | 62 |
| 29 | 75 | 541 | 3632 | 1357 | 57 |
| 30 | 85 | 524 | 3532 | 1389 | 57 |
| 31 | 90 | 535 | 3484 | 1292 | 56 |
| 32 | 100 | 555 | 3406 | 1132 | 55 |
| 33[a] | 0 | 415 | 2790 | 1844 | 65 |
| 34 | 0 | 408 | 3412 | 2463 | 70 |
| 35 | 5 | 393 | 3328 | 2397 | 70 |
| 36 | 10 | 406 | 3272 | 2225 | 70 |
| 37 | 15 | 417 | 3513 | 2335 | 70 |
| 38 | 25 | 432 | 3376 | 2039 | 67 |
| 39 | 50 | 499 | 3698 | 1694 | 64 |
| 40 | 75 | 546 | 3901 | 1442 | 60 |
| 41 | 85 | 520 | 3662 | 1422 | 60 |
| 42 | 90 | 555 | 3754 | 1242 | 59 |
| 43 | 100 | 545 | 3787 | 1355 | 57 |

[a]Average of two samples.

Examples 1-10 are controls without any quaternary salt but with clay and show the ultimate tensile strength, $T_u$, is comparable to or higher than the carbon black control Ex. 1 for all % levels of kaolin replacement. The % elongation generally increased with kaolin concentration. However, the $T_{300}$ modulus showed a continuing decrease with higher levels of replacement.

Examples 11-21 add 0.2 phr quaternary salt to the compositions as in 1-10, with Example 11 a control without clay or salt and Example 12 a composition of this invention containing salt but without clay. Examples 22-43 are the same as Examples 11-21 with higher quaternary salt levels—0.4 phr in Examples 22-32 and 0.6 phr in Examples 33-43. In these series, the controls are Examples 22 and 33 (no kaolin or quaternary), and Examples 23 and 34 contain quaternary but no kaolin.

The rheometer data show scorch safety (infered from $T_{S2}$) generally decreased with increasing quaternary. The optimum $T_{90}$ cure time behaved similarly.

It is very significant that in all three series, 11-21, 22-32, and 33-43, the highest increase in the $T_{300}$ modulus over the $T_{300}$ of the control without clay and quaternary was seen in those Examples with quaternary at 0% clay—see Examples 12, 23, and 34. These surprising results indicate that the modulus enhancement is due to a synergism or interaction between the carbon black and the quaternary ammonium salts. Without wishing to be bound by theory, applicants believe the quaternary salt is acting as a coupling agent for filler and rubber. This invention takes advantage of this unexpected interaction which results in higher modulus properties in natural rubber compositions.

The effect of the quaternary salt on the carbon black is also seen in comparing Examples 1-10 (the clay controls without quaternary) to Examples 13-21, 24-32, and 35-43 (the clay samples with quaternary). Note that with 0.2 phr quaternary the Examples up to 75% clay had higher modulus than the corresponding ones in Examples 1-10, and that at 0.4 and 0.6 phr quaternary, at essentially any clay level the $T_{300}$ was higher than 1-10.

EXAMPLES 44-49

Examples 44-49 illustrate the properties of natural rubber vulcanizates of the invention comprising carbon black and varying amounts of a quaternary salt and are used to show the effect on tensile properties of different levels of the quaternary salt. The procedure used was as in Examples 1-43 except no clay was added with the quaternary salt. The rubber formulation was again the ASTM-NR varied only by addition of 1 phr Reogen. The amounts of Adogen 470 added, and tensile, rheometric and trouser tear properties of the $T_{90}$ cured vulcanizates are shown in Table III and IV. The trouser tear data is an average of tests of two samples.

TABLE III

| Example | phr Adogen | Tu (psi) | $T_{300}$ (psi) | Eu (%) |
|---|---|---|---|---|
| 44 | 0.0 | 2805 | 1846 | 416 |
| 45 | 0.1 | 2988 | 2016 | 411 |
| 46 | 0.3 | 3314 | 2244 | 422 |
| 47 | 0.6 | 3538 | 2510 | 412 |
| 48 | 0.8 | 3456 | 2525 | 397 |
| 49 | 1.0 | 3430 | 2557 | 390 |

TABLE IV

| Example | phr Adogen | $T_{S2}$ (min) | $T_{90}$ (min) | Maximum tear (ppi) | Tear Rating[b] |
|---|---|---|---|---|---|
| 44 | 0.0 | 2.5 | 11.6 | 31.0 | F-G |
| 45 | 0.1 | 2.2 | 8.8 | 26.6 | F-G |
| 46 | 0.3 | 1.8 | 6.6 | 19.8 | G |
| 47 | 0.6 | 1.5 | 5.7 | 20.6 | G-E |
| 48 | 0.8 | 1.3 | 5.3 | 26.3 | G-E |
| 49 | 1.0 | 1.2 | 5.0 | 21.9 | G-E |

[b]Same rating as above.

Examples 44-49 first show the beneficial effect on $T_{300}$ modulus values which increased substantially with quaternary concentration up to 0.6 phr over that of control No. 44. From 0.6 to 1.0 phr, the $T_{300}$ was relatively constant. In a similar manner, the ultimate tensile strength also increased up to 0.6 phr quaternary and remained relatively constant above 0.6 phr. As is usually observed with rubber compositions, the ultimate elongation decreased as $T_{300}$ increased. These results show the responsiveness of natural rubber to a quaternary salt additive.

EXAMPLES 50-61

Examples 50-61 are for comparison of the natural rubber compositions of this invention as in Examples 44-49 to similar compositions in styrene butadiene rubber. The ASTM-SBR formulation of 100 parts SBR, 50 parts N330 carbon black, 1 part stearic acid, 3 parts zinc oxide, 1.75 parts sulfur, and 1 part Santocure NS (from Monsanto) was used. The mixing procedure was as set out for Examples 1-43 except that only additional SBR, and no Reogen, was added to the examples which contained clay to maintain the ASTM-SBR formula. Adogen 470 at a level of 0.6 phr and varying amounts of the above Windsor Clay were used. Table V shows the volume % clay used, $T_{300}$ modulus, $E_u$, and $T_u$.

TABLE V

| Example | Vol. % Replacement | $T_u$ (psi) | 300% Modulus (psi) | $E_u$ (%) |
|---|---|---|---|---|
| 50 | 0 | 3818 | 2413 | 420 |

TABLE V-continued

| Example | Vol. % Replacement | $T_u$ (psi) | 300% Modulus (psi) | $E_u$ (%) |
|---|---|---|---|---|
| 51 | 0 | 3766 | 2462 | 411 |
| 52 | 0 | 3859 | 2822 | 380 |
| 53 | 5 | 4053 | 2558 | 420 |
| 54 | 10 | 4015 | 2449 | 431 |
| 55 | 15 | 3719 | 2228 | 433 |
| 56 | 25 | 3810 | 1943 | 463 |
| 57 | 50 | 3708 | 1193 | 544 |
| 58 | 75 | 3187 | 672 | 604 |
| 59 | 85 | 3202 | 567 | 635 |
| 60 | 90 | 3071 | 532 | 641 |
| 61 | 100 | 1952 | 462 | 629 |

FIGS. 1 and 2 are plots of $T_{300}$ modulus versus Vol. % of clay for Examples 33–43 and Examples 50–61 respectively, and more easily illustrate the increased effectiveness of a quaternary ammonium salt in natural rubber compared to styrene-butadiene rubber. The Figures show that the increment of modulus increase in natural rubber from the quaternary salt is about one and one half times that in SBR. Furthermore, at 0.6 phr quaternary $T_{300}$ equivalent to or higher than the control can only be maintained in SBR up to about 9% clay replacement, but in natural rubber can be maintained up to about 24% clay. The comparisons with the Figures illustrate the unobvious and much greater effect of a quaternary salt in natural rubber.

EXAMPLE 62

Example 62 shows the difference between the natural rubber compositions of this invention and the powdered rubber produced by the precipitation method of Berg, et al., U.S. Pat. No. 3,998,778. Berg's rubbers are formed by precipitation from a sodium silicate solution and contain silicate as an unavoidable ingredient. Applicant's natural rubber comprise no added mineral filler.

Example I of Berg was duplicated as follows. Initially, 1000 g. of a 10 wt. % polybutadiene solution in hexane was prepared. This mixture was defined as solution A. Six grams of 50 wt. % cetyltrimethyl ammonium chloride and 5 g. of 10 wt. % sulfuric acid were added to one liter water; this mixture, defined as solution B, was stirred for about 10 minutes.

Solution A was added to solution B and emulsified utilizing an ultrasonic unit. Then, 1000 g. of a 5 wt. % aqueous suspension of N550 carbon black was added to the emulsified mixture, followed by further treatment with the ultrasonic unit.

A separate solution was prepared by adding 45 g. of a 26 wt. % sodium silicate solution to a kettle containing 4½ liters of distilled water. The contents of the kettle were stirred and heated to 80°–90° C. at which point the emulsified carbon black/polymer mixture was added slowly. Hexane was allowed to distill off. After cooling overnite, the contents were filtered and the residue collected.

Gravimetric analysis of the product rubber showed that it contained 4.96 grams silicate expressed as $SiO_2$, or 53% of the original 9.29 grams of silicate in the aqueous solution. Analysis of the leftover solution by atomic absorption spectroscopy for a material balance showed 4.53 grams $SiO_2$, or 49%. Thus, all rubber compositions produced by the method of Berg contain silicate, which is a known rubber filler.

EXAMPLES 63–66

U.S. Pat. No. 3,627,723, Kealy, discloses use of surfactants in carbon black and/or mineral filled rubbers made from a co-polymer of an $\alpha$-olefin and a non-conjugated diene. To illustrate the differences between Kealy's three surfactant classes in rubber compositions other than those claimed in Kealy, rubber formulations each containing only one surfactant were vulcanized and the vulcanized rubber composition properties were measured. The surfactants used included one from each of the Kealy classes, and were Siponate 330—alkyl benzene sulfonate salt (anionic); Adogen 470—dimethylditallow ammonium chloride (cationic); and Lonzest SMP—sorbitan monopalmitate (non-ionic). Table VI lists the formulation amounts in phr of the components in each rubber composition. The compositions in Table VI started with a masterbatch, called CIM 11, which was formulated in a ratio of 100 parts styrene-butadiene rubber (SBR) to 80 parts N330 carbon black. To the CIM 11 was added sufficient SBR (SBR 1502) to produce a carbon black level of 50 phr. The compositions in Table X did not contain mineral filler. The stearic acid, ZIC Stick (a form of zinc oxide), sulfur and Santocure NS are conventional rubber components added for vulcanization.

The rubber mixing procedure was that all components but the sulfur and Santocure NS were mixed in a Banbury mixer at a starting temperature of about 300° F. for 5 minutes. A portion of this mixture was removed and the sulfur and Santocure NS were rolled up in the middle. This portion was then returned to the Banbury mixer and mixed for 2 minutes. The final temperatures varied depending upon the sample from 235° F. to 245° F.

TABLE VI

| Component | 63 | 64 | 65 | 66 |
|---|---|---|---|---|
| SBR 1502 | 37.5 | 37.5 | 37.5 | 37.5 |
| CIM II | 112.5 | 112.5 | 112.5 | 112.5 |
| Stearic Acid | 1 | 1 | 1 | 1 |
| ZIC Stick | 3 | 3 | 3 | 3 |
| Adogen 470 | — | 2.31 | — | — |
| Siponate 330 | — | — | 1.5 | — |
| Lonzest SMP | — | — | — | 1.5 |
| Sulfur | 1.75 | 1.75 | 1.75 | 1.75 |
| Santocure NS | 1 | 1 | 1 | 1 |
| phr Carbon Black | 50 | 50 | 50 | 50 |
| phr Adogen 470 | — | 1.5 | — | — |
| phr Siponate 330 | — | — | 1.5 | — |
| phr Lonzest SMP | — | — | — | 1.5 |
| St. Temp. °F. | 298 | 293 | 295 | 304 |
| Final Temp. °F. | 245 | 236 | 238 | 235 |
| $T_{90}$ Time min. | 18.2 | 14.0 | 14.0 | 19.0 |

The rubber compositions were vulcanized to a $T_{90}$ cure, and the $T_{300}$ modulus property ($M_{300}$ in Kealy). $T_{S2}$ cure rate and trouser tear rating were measured. Table VII lists the properties of the vulcanized rubbers.

TABLE VII

| Property | 63 | 64 | 65 | 66 |
|---|---|---|---|---|
| $T_{300}$ | 3156 | 3618 | 3037 | 2856 |
| Trouser Tear Rating | Poor | Good | Fair | Fair |
| $T_{S2}$ Min. | 6.8 | 3.3 | 6.4 | 7.1 |

Comparing the $T_{300}$ moduli, it is readily seen that only Example 64 with the cationic surfactant, which is a quaternary ammonium salt claimed by applicants, improved the $T_{300}$ over that of the control Example 63. From the cure rate, only the quaternary salt strongly accelerated cure rate. The quaternary salt also produced a better trouser tear rating than the other two surfactants. These superior effects and differences of cationic quaternary ammonium salts are not disclosed by Kealy since the surfactant classes are taught as equivalent with the Kealy rubber. See the M modulus properties in Table V of the Kealy examples which shows virtually identical behavior.

The above tests show the unobvious and superior effects of a quaternary salt when used in filled rubbers different than in Kealy, since in contrast, the modulus properties in the Kealy examples show little variation between his three classes of surfactant. Although these examples used styrene butadiene rubber, similar results are believed to occur if the other two surfactant classes were tested in natural rubber. The basis of this belief is that both anionic and nonionic were ineffective in SBR while the quaternary does improve modulus significantly. Thus, even if the anionic and nonionic are effective in natural rubber, their effect would be much less the quaternary effect.

EXAMPLES 67–69

These examples illustrate the quaternary salt effect in a mixture of natural rubber and polybutadiene rubber. A batch containing varying amounts of natural rubber, 50 phr of polybutadiene rubber and varying amounts of a master batch containing 50.5 weight percent of natural rubber, 40.4 weight percent of ASTM N330 carbon black, 8.1 weight percent of light process oil (Witco's Cyclolube NN-2) and 1 weight percent of the plasticizer Reogen TM (manufactured by R. T. Vanderbilt) was employed in each of Examples 1–44. In each case, the batch was introduced into a water-cooled 2-roll external mill in which the rolls were set to a thickness of 1/16 inch and one roll was operated at 14 rpm and the second roll at 18 rpm and the rubber was mixed until a band formed. At this point 3 phr of zinc oxide and 2 phr of stearic acid were introduced onto the mill, and mixing was continued until the zinc oxide and stearic acid were fully incorporated into the rubber and the mixture appeared homogeneous. Next, the band was cut to form a sheet of the rubber mixture, which was then removed from the mill folded over on itself, and turned and reinserted into the mill so that the reinserted sheet traveled through the mill along a line in the reinserted sheet which was approximately perpendicular to the line in the sheet along which the sheet last traveled through the mill. The process of cutting, removing, folding, turning and reinserting was repeated nine times. The reinserted sheet was then allowed to again form a band in the mill, at which point the 2 phr of antiozonant Santoflex 13F (N-(1,3-dimethylbutyl)-N-phenyl-p-phenylenediamine) marketed by Monsanto and 2 phr of the antioxidant Agerite D (polymerized 1,2-dihydro-2,2,4-trimethylquinoline) marketed by R. T. Vanderbilt, and 3 phr of petroleum wax (Witco Chemical's Sunolite 240) were introduced into the mill and mixing was continued until the antioxidant, antiozonant and wax were fully incorporated into the rubber and the mixture appeared homogeneous. At this point additional light process oil (Witco Cyclolube NN-2), and varying amounts of a quaternary ammonium salt were added to the mixture in the mill. The process of milling, cutting the band, removing the resulting sheet from the mill and folding, turning and reinserting the sheet as described above was performed eight times. The band was then cut and the rubber sheet was removed from the mill and allowed to cool for up to an hour. The sheet was then reinserted in the mill and rebanded and 2 phr of sulfur and 0.8 phr of the accelerator N-t-butyl-2-benzothiazole sulfenamide (Monsanto's Santocure NS) were added. The process of milling, cutting the band, removing the resulting sheet from the mill and folding, turning and reinserting the sheet as described above was performed eight times. The amounts of the master batch, additional rubber, quaternary ammonium salt, carbon black filler filler and light process oil employed in each example are shown in Table VIII.

At this point the rubber mixture was cut and removed from the 2-roll mill, and the resulting sheets were cooled and stored at room temperature overnight. Prior to vulcanization, the sheets were remilled in the 2-roll mill. The remilled sheets were vulcanized at 160° C. using a compression molding technique.

Ditallow dimethyl ammonium chloride was the quaternary ammonium salt employed in Examples 67–69. The rheometric data, tensile properties, dynamic properties static properties, tear resistance, fatigue, hardness, and rebound of the vulcanizates were measured as above except ASTM test D-624-73-DIE C was used for tear testing, and the data appears in TABLES IX–XII.

TABLE VIII

| Example No. | Composition | | |
|---|---|---|---|
| | Master Batch | 4° Salt | Carbon Black |
| 67 | 99 | 0.20 | 40 |
| 68 | 90 | 0.40 | 40 |
| 79 | 99 | — | 40 |

TABLE IX

| Example No. | Rheometric Properties | | | | |
|---|---|---|---|---|---|
| | $M_L$ (inch-lbs.) | $M_H$ (inch-lbs.) | $T_{S2}$ (min.) | $T_c(10)$ (min.) | $T_c(90)$ (min.) |
| 67 | 7.0 | 31.0 | 2.6 | 2.7 | 5.2 |
| 68 | 8.0 | 33.0 | 1.9 | 2.0 | 4.3 |
| 69 | 7.0 | 27.5 | 4.0 | 4.0 | 7.4 |

TABLE X

| Example No. | Static Properties | | | | | |
|---|---|---|---|---|---|---|
| | $E_u$ (%) | $T_u$ (psi) | $T_{400}$ (psi) | $T_{300}$ (psi) | $T_{200}$ (psi) | $T_{100}$ (psi) |
| 67 | 506 | 2365 | 1652 | 1056 | 547 | 229 |
| 68 | 454 | 2106 | 1744 | 1122 | 586 | 240 |
| 69 | 566 | 2122 | 1248 | 776 | 400 | 175 |

TABLE XI

| Example No. | Dynamic Properties | | |
|---|---|---|---|
| | M' (psi) | M'' (psi) | Tan Delta |
| 67 | 1111 | 159 | 0.143 |
| 68 | 1001 | 146 | 0.134 |
| 69 | 1049 | 176 | 0.168 |

TABLE XII

| Example No. | Tear Resistance Die C (psi) | Shore A Hardness | Rebound D (%) | Flex Fatigue (Cycles ÷ 100) |
|---|---|---|---|---|
| 67 | 280 | 52 | 47 | 517 |

TABLE XII-continued

| Example No. | Tear Resistance Die C (psi) | Shore A Hardness | Rebound D (%) | Flex Fatigue (Cycles ÷ 100) |
|---|---|---|---|---|
| 68 | 440 | 53 | 50 | 838 |
| 69 | 260 | 50 | 42 | 723 |

Examples 67 and 68 compared to control Example 69 show the beneficial effect of a quaternary salt on $T_{300}$ modulus of a polybutadiene/natural rubber mixture. Both Example 67, at 0.2 phr salt, and Example 68 at 0.4 phr salt, had higher $T_{300}$ than the control.

From the above description it is apparent that while only certain embodiments have been set forth, alternative embodiments and various modifications will be apparent from the above description to those skilled in the art. These and other alternatives are considered equivalents and within the spirit and scope of the present invention.

Having described the invention, what is claimed is:

1. A method of compounding rubber comprising mechanically mixing and substantially uniformly dispersing the following materials in a rubber comprising at least about 5% natural rubber:
   A. (1) a reinforcing filler consisting essentially of particulate carbon black having a median particle size in the range of from about 0.001 to about 20 microns, and
   A. (2) a coupling agent consisting essentially of a quaternary ammonium salt at a level of from about 0.005 to about 15 phr; or
   B. a particulate adduct of a reinforcing filler consisting essentially of the particulate carbon black and a coupling agent consisting essentially of the quaternary ammonium salt, having a median particle size in the range of from about 0.001 to about 20 microns and present at a level such that the portion thereof contributed from the quaternary ammonium salt is at a level of from about 0.005 to about 15 phr, wherein the amount of the carbon black or the portion of the aforesaid adduct contributed from the carbon black are in the range of from about 5 to about 400 phr.

2. The method of claim 1 wherein a sulfur or sulfur-donating curing agent is employed.

3. The method of claim 1 wherein the median particle size of the carbon black and of the adduct containing the carbon black is in the range of from about 0.001 to about 1 micron.

4. The method of claim 1 wherein the amount of the carbon black or the portion of the adduct contributed from the carbon black are in the range of from about 30 to about 120 phr.

5. The method of claim 1 wherein the quaternary ammonium salt and the portion of each of the adducts contributed from the quaternary ammonium salt are each at a level of from about 0.10 to about 1.5 phr.

6. The method of claim 1 wherein the quaternary ammomium salt has a structure of formula I, II, III, IV, or V:

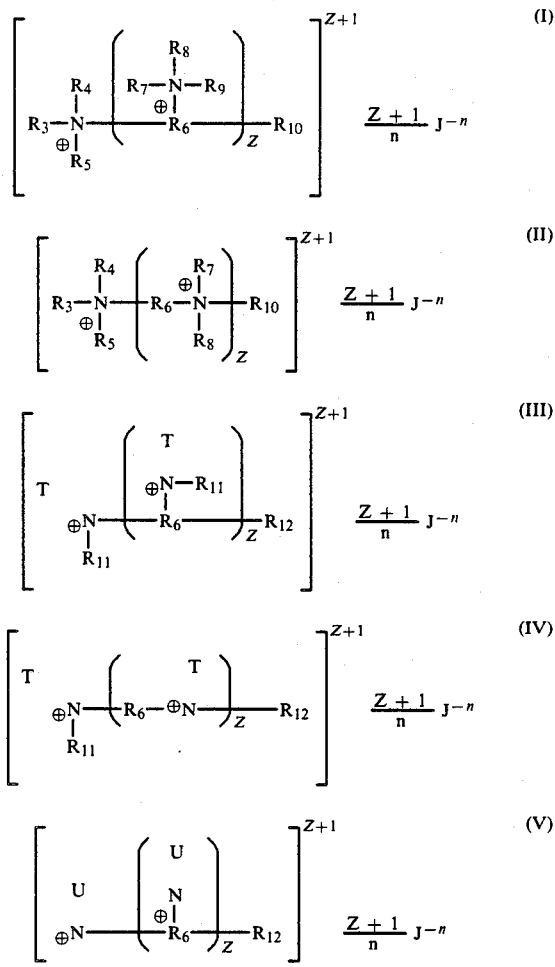

wherein Z is zero or a positive integer from 1 to 100, J is an anionic radical, n is the absolute value of the oxidation state of J, and $R_6$ is an alkylenyl radical containing from 2 to 20 carbon atoms or an aryl radical containing from 6 to 14 carbon atoms, wherein formulas I and II, $R_3$, $R_4$, $R_5$, $R_7$, $R_8$ and $R_9$ are the same or different and are each selected from the group consisting of: aliphatic radicals containing a total of from 1 to 3 carbon atoms which are saturated or unsaturated and unsubstituted or substituted with at least one hydroxy or alkoxy group; aliphatic radicals containing a total of from 8 to 40 carbon atoms which are saturated or unsaturated and unsubstituted or substituted with at least one hydroxy, alkoxy or polyalkoxy group; aryl radicals containinq from 6 to 18 carbon atoms; and saturated and unsaturated araliphatic radicals containing a total of from 7 to 48 carbon atoms, wherein formulas I and II, when Z is zero, $R_{10}$ is selected from the group consisting of the groups described by $R_3$, $R_4$, $R_5$, $R_7$, $R_8$ and $R_9$, and when Z is a positive integer, $R_{10}$ is selected from the group consisting of the groups described by $R_3$, $R_4$, $R_5$, $R_7$, $R_8$ and $R_9$ and a hydrogen atom, wherein formulas I and II, (1) at least one of $R_3$, $R_4$, $R_5$, $R_7$, $R_8$, $R_9$ and $R_{10}$ is an aliphatic radical containing a total of from 1 to 3 carbon atoms and (2) either (a) at least one of $R_3$, $R_4$, $R_5$, $R_7$, $R_8$, $R_9$ and $R_{10}$ is an aliphatic radical containing at least 12 carbon atoms or (b) at least two of $R_3$, $R_4$, $R_5$, $R_7$, $R_8$, $R_9$ and $R_{10}$ are aliphatic radicals containing at least 8 carbon atoms, wherein formulas III, IV and V, each of T and U is a radical which, in conjunction with each nitrogen atom to which it is shown attached in formula III, IV or V, forms a heterocyclic radical containing at least one nitrogen atom in the ring system and containing only nitrogen and carbon atoms in the ring system, and the T and U portions of the ring system are unsubstituted or substituted by at least one alkyl group with the total number of ring substituents on each of T and U being from 1 to 32 carbon atoms, wherein formulas III and IV, $R_{11}$ is selected from the group consisting of the groups described by $R_3$, $R_4$, $R_5$, $R_7$, $R_8$ and $R_9$ and alkylamidoalkyl or alkylesteralkyl groups containing a total of at least 14 carbon atoms, and wherein formulas III, IV and V, when Z is zero, $R_{12}$ is selected from the group consisting of the groups described by $R_{11}$, and when Z is a positive integer, $R_{12}$ is selected from the group consisting of the groups described by $R_{11}$ and a hydrogen atom.

7. The method of claim 6 wherein in each of formulas I, II, III, IV and V, at least one of $R_3$, $R_4$, $R_5$, $R_7$, $R_8$, $R_9$, $R_{10}$, $R_{11}$ and $R_{12}$ is a methyl radical.

8. The method of claim 6 wherein in each of formulas I, II, III, IV and V, at least one of $R_3$, $R_4$, $R_5$, $R_7$, $R_8$, $R_9$, $R_{10}$, $R_{11}$ and $R_{12}$ is an aliphatic radical containing from 12 to 22 carbon atoms.

9. The method of claim 6 wherein, in each of formulas I, II, III, IV and V, at least one of $R_3$, $R_4$, $R_5$, $R_7$, $R_8$, $R_9$, $R_{10}$, $R_{11}$ and $R_{12}$ is an aliphatic radical containing a polyalkoxy radical containing from 2 to 15 repeating ethoxy radical units.

10. The method of claim 6 wherein in each of formulas I, II, III, IV and V, at least one of $R_3$, $R_4$, $R_5$, $R_7$, $R_8$, $R_9$, $R_{10}$, $R_{11}$ and $R_{12}$ is an araliphatic radical containing from 7 to 22 carbon atoms.

11. The method of claim 8 wherein $R_6$ is an alkylenyl radical containing from 2 to 6 carbon atoms.

12. The method of claim 6 wherein each of T and U is a radical in conjunction with the nitrogen atom to which it is shown attached in formula III, IV or V forms a quaternary ammonium salt selected from the group consisting of pyrrolidinium, pyrrolium, pyrrolinium, imidazolium, pyrazolium, triazolium, pyridinium, pyrimidinium, pyridazinium, pyrazinium, triazinium, indolium, indazolium, benzimidazolium, quinolinium, isoquinolinium, cinnolinium, phthalazinium, quinazolinium, quinoxalinium, naphthyridinium, quinolizinium, carbazolium, acridinium, phenazinium, phenanthridinium, phenanthrolinium, benzo[H]isoquinolinium, purinium, porphinium, and pteridinium, the heterocyclic rings being unsubstituted or substituted by at least one alkyl group, and the quaternary ammonium salts formed by partial or complete hydrogenation of the heterocyclic rings of any of the aforesaid quaternary ammonium salts.

13. The method of claim 6 wherein Z is zero or 1.

14. The rubber composition formed by the method of claim 1.

15. A rubber composition comprising a substantially uniform dispersion of the following materials in rubber:
A. (1) a reinforcing filler consisting essentially of particulate carbon black having a median particle size in the range of from about 0.001 to about 20 microns, and
A. (2) a coupling agent consisting essentially of a quaternary ammonium salt at a level of from about 0.005 to about 15 phr; or
C. a particulate adduct of a filler consisting essentially of the particulate carbon black and a coupling agent consisting essentially of the quaternary ammonium salt, having a median particle size in the range of from about 0.001 to about 20 microns and present at a level such that the portion thereof contributed from the quaternary ammonium salt is at a level of from about 0.005 to about 15 phr, and
C. B, C or D above wherein the particulate adduct in B or C or at least one of the particulate adducts in D is also an adduct with the rubber; wherein the amount of the carbon black or the portion of the aforesaid adduct contributed from the carbon black are in the range of from about 5 to about 400 phr.

16. The composition of claim 16 wherein the median particle size of the carbon black and of the adduct containing the carbon black is in the range of from about 0.001 to about 1 micron.

17. The composition of claim 16 wherein the amount of the carbon black or the portion of the adduct contributed from the carbon black is in the range of from about 30 to about 120 phr.

18. The composition of claim 16 wherein the quaternary ammonium salt and the portion of each of the adducts contributed from the quaternary ammonium salt are each at a level of from about 0.10 to about 1.5 phr.

19. The composition of claim 16 wherein the quaternary ammonium salt has a structure of formula I, II, III, IV or V:

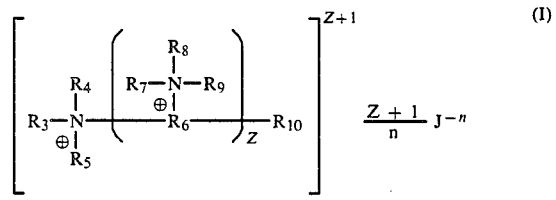

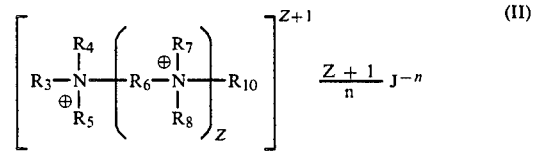

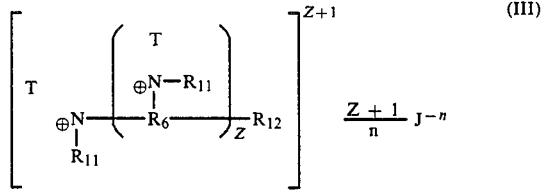

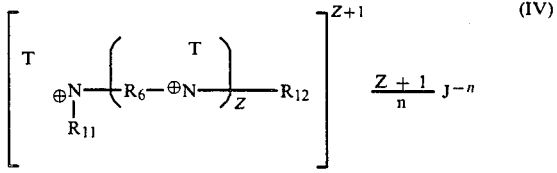

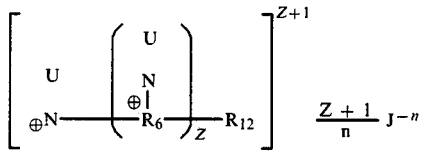

wherein Z is zero or a positive integer from 1 to 100, J is an anionic radical, n is the absolute value of the oxidation state of J, and $R_6$ is an alkylenyl radical containing from 2 to 20 carbon atoms or an aryl radical containing from 6 to 14 carbon atoms, wherein formulas I and II, $R_3$, $R_4$, $R_5$, $R_7$, $R_8$ and $R_9$ are the same or different and are each selected from the group consisting of: aliphatic radicals containing a total of from 1 to 3 carbon atoms which are saturated or unsaturated and unsubstituted or substituted with at least one hydroxy or alkoxy group; aliphatic radicals containing a total of from 8 to 40 carbon atoms which are saturated or unsaturated and unsubstituted or substituted with at least one hydroxy, alkoxy or polyalkoxy group; aryl radicals containing from 6 to 18 carbon atoms; and saturated and unsaturated araliphatic radicals containing a total of from 7 to 48 carbon atoms, wherein formulas I and II, when Z is zero, $R_{10}$ is selected from the group consisting of the groups described by $R_3$, $R_4$, $R_5$, $R_7$, $R_8$ and $R_9$, and when Z is a positive integer, $R_{10}$ is selected from the group consisting of the groups described by $R_3$, $R_4$, $R_5$, $R_7$, $R_8$ and $R_9$ and a hydrogen atom, wherein formulas I and II, (1) at least one of $R_3$, $R_4$, $R_5$, $R_7$, $R_8$, $R_9$ and $R_{10}$ is an aliphatic radical containing a total of from 1 to 3 carbon atoms and (2) either (a) at least one of $R_3$, $R_4$, $R_5$, $R_7$, $R_8$, $R_9$ and $R_{10}$ is an aliphatic radical containing at least 12 carbon atoms, or (b) at least two of $R_3$, $R_4$, $R_5$, $R_7$, $R_8$, $R_9$ and $R_{10}$ are aliphatic radicals containing at least 8 carbon atoms, wherein formulas III, IV and V, each of T and U is a radical which, in conjunction with each nitrogen atom to which it is shown attached in formula III, IV or V, forms a heterocyclic radical containing at least one nitrogen atom in the ring system and containing only nitrogen and carbon atoms in the ring system, and the T and U portions of the ring system are unsubstituted or substituted by at least one alkyl group with the total number of ring substituents on each of T and U being from 1 to 32 carbon atoms, wherein formulas III and IV, $R_{11}$ is selected from the group consisting of the groups described by $R_3$, $R_4$, $R_5$, $R_7$, $R_8$ and $R_9$ and alkylamidoalkyl or alkylesteralkyl groups containing a total of at least 14 carbon atoms, and wherein formulas III, IV and V, when Z is zero, $R_{12}$ is selected from the group consisting of the groups described by $R_{11}$, and when Z is a positive integer $R_{12}$ is selected from the group consisting of the groups described by $R_{11}$ and a hydrogen atom.

20. The composition of claim 20 wherein in each of formulas I, II, III, IV and V, at least one of $R_3$, $R_4$, $R_5$, $R_7$, $R_8$, $R_9$, $R_{10}$, $R_{11}$ and $R_{12}$ is a methyl radical.

21. The composition of claim 20 wherein in each of formulas I, II, III, IV and V, at least one of $R_3$, $R_4$, $R_5$, $R_7$, $R_8$, $R_9$, $R_{10}$, $R_{11}$ and $R_{12}$ is an aliphatic radical containing from 12 to 2 atoms.

22. The composition of claim 20 wherein, in each of formulas I, II, III, IV and V, at least one of $R_3$, $R_4$, $R_5$, $R_7$, $R_8$, $R_9$, $R_{10}$, $R_{11}$ and $R_{12}$ is an aliphatic radical containing a polyalkoxy radical containing from 2 to 15 repeating eth radical units.

23. The composition of claim 20 wherein in each of formulas I, II, III, IV and V, at least one of $R_3$, $R_4$, $R_5$, $R_7$, $R_8$, $R_9$, $R_{10}$, $R_{11}$ and $R_{12}$ is an araliphatic radical containing from 7 to 22 carbon atoms.

24. The composition of claim 20 wherein $R_6$ is an alkylenyl radical containing from 2 to 6 carbon atoms.

25. The composition of claim 20 wherein each of T and U is a radical in conjunction with the nitrogen atom to which it is shown attached in formula III, IV or V forms a quaternary ammonium salt selected from the group consisting of pyrrolidinium, pyrrolium, pyrrolinium, imidazolium, pyrazolium, triazolium, pyridinium, pyrimidinium, pyridazinium, pyrazinium, triazinium, indolium, indazolium, benzimidazolium, quinolinium, isoquinolinium, cinnolinium, phthalazinium, quinalizinium, quinoxalinium, naphthyridinium, quinolizinium, carbazolium, acridinium, phenazinium, phenanthridinium, phenanthrolinium, benzoisoquinolinium, purinium, porphinium, and pteridinium, the heterocyclic rings being unsubstituted or substituted by at least one alkyl group, and the quaternary ammonium salts formed by partial or complete hydrogenation of the heterocyclic rings of any of the aforesaid quaternary ammonium salts.

26. The composition of claim 20 wherein Z is zero or 1.

* * * * *